Aug. 1, 1967 J. H. STREETS 3,333,753

HELICAL SCAN MAGNETIC TAPE APPARATUS WITH A SQUEEZE FILM BEARING

Filed June 17, 1965 4 Sheets-Sheet 1

JOHN H. STREETS
INVENTOR

BY Robert S. Clay

ATTORNEY

JOHN H. STREETS
INVENTOR.
BY Robert H. Clay
ATTORNEY

JOHN H. STREETS
INVENTOR.

BY Robert G. Clay

ATTORNEY

JOHN H. STREETS
INVENTOR.
BY Robert G. Clay
ATTORNEY 3,333,753

HELICAL SCAN MAGNETIC TAPE APPARATUS WITH A SQUEEZE FILM BEARING

John H. Streets, Redwood City, Calif., assignor to Ampex Corporation, Redwood City, Calif., a corporation of California Filed June 17, 1965, Ser. No. 464,765
10 Claims. (Cl. 226—97)

ABSTRACT OF THE DISCLOSURE

Apparatus having coaxially aligned cylindrical drums, one fixed and one rotatable, about which magnetic tape is helically guided during scanning by a magnetic transducer head carried by the rotatable drum. The tape is supported with negligible friction adjacent the drums by an air bearing generated beneath the portion of tape overlying the rotatable drum by air swept in by the rotation, and beneath the portion of tape overlying the fixed drum by a squeeze film of air arising from penetration of the tape by the head, or other protuberance of the rotatable drum.

This invention relates generally to gas lubricated bearings for helically wrapped foils, and is more particularly directed to a squeeze film bearing for supporting helically wrapped tape in magnetic tape recording and reproducing apparatus during a helical scanning operation.

Helical scan magnetic tape recording and reproducing apparatus is employed to provide a relatively high density of signal in each track recorded on the tape. This is particularly desirable in the recording and playback of television signals since an entire frame may be readily included in a single relatively long track recorded on the tape at small acute angles to the edges thereof. Various switching and synchronization problems encountered with transverse scan tape apparatus wherein a relatively large number of tracks must be combined to reproduce a single frame are not present in a helical scan system. As a result there is a comparative reduction in the complexity and cost of helical scan tape apparatus. However, in conventional helical scan magnetic tape recording and reproducing apparatus substantial rubbing friction is exerted on the tape as it is moved helically about the guides of the scanning assembly thereof. The friction is not only undesirable from the standpoint of tape wear, but also the frictional effects contribute materially to tape tension variations which in turn degrade the time base stability of the recorded and/or reproduced signals. Servo systems of relatively great complexity are therefore required to compensate the tension variations and increase the time base stability to an acceptable level.

In order to provide helical scan magnetic tape recording and reproducing apparatus of very low cost such as would be feasible for home use, it is apparent that the friction exerted on the tape must be reduced to a negligible level in order to correspondingly reduce the requirements of the servo system. However, the cost of reducing friction must be of low order such that a substantial overall cost reduction is realized from simplification of the servo system. In order to reduce tape friction it is the usual practice to provide a gas lubricated bearing for supporting the tape as it is moved about the helical scanning assembly. An air bearing may be provided by forced air lubrication of the tape. However, forced air lubrication systems require relatively costly pumps, calibrated orifices, and complex plumbing to generate the bearing, and moreover the reduction in tape friction produced is not sufficiently great that the complexity of the servo system can be materially reduced. Forced air lubrication systems are thus not feasible as a means for reducing the cost of helical scan magnetic tape recording and reproducing apparatus.

A very satisfactory solution to the problem of economically generating an effective gas bearing involves self-energized air lubrication as disclosed in a co-pending application for U.S. Letters Patent Serial No. 432,312, by Streets et al., filed Feb. 12, 1965, for Helical Scan Magnetic Tape Apparatus With Self-Energized Air Lubrication and assigned to the assignee of the present invention. In this regard, perfect self-energized lubrication of the tape is provided by extending the tape in a helical wrap about a pair of counter-rotating drums of the scanning assembly. In this manner, air entrance regions are established to sweep air beneath the tape at its points of entry to, and exit from, the scanning assembly drums. The air is directed in opposite directions diagonally beneath adjacent diagonal halves of the tape to thereby provide full lubrication of the tape. It was also mentioned in the copending application that only one of the drums could be rotated to generate an air film. However, in the absence of other bearing generating mechanism, the resulting lubrication is a minor percentage of the full lubrication effected by counter rotating both drums.

It is an object of the present invention to provide for the generation of a helically wrapped foil gas bearing providing a lubrication closely approaching 100% by means of a single rotating drum and a stationary drum.

Another object of the invention is the provision of a helical scanning assembly including a fixed drum and a rotatable drum about which the tape extends in a helical wrap and whereby a diagonal half of the tape wrap is lubricated by a self-acting air bearing and the other diagonal half of the tape wrap is lubricated by a squeeze film bearing.

Still another object of the invention is the provision of a scanning assembly of the class described wherein a projecting transducer head or other protuberance on the rotating drum adjacent the clearance gap between the rotating and stationary drums is effective in producing a squeeze film bearing for supporting the half of the helically wrapped tape that overlies the stationary drum.

It is yet another object of the invention to provide a gas lubricated helical wrap scanning assembly of the class described which is suited to use with helical wraps of varied angular extents such as 180°, nearly 360°, and 360°.

It is a further object of the invention to provide a helical wrap scanning assembly which while being relatively simple and low cost in design is capable of generating an air bearing whose effect closely approaches full lubrication.

Additional objects and advantages of the invention will become apparent upon consideration of the following description of a preferred embodiment of the invention in conjunction with the accompanying drawings, wherein.

In accordance with the basic aspects of the present invention there is provided a helical scanning or guiding assembly including a pair of coaxially aligned closely spaced cylindrical drums, one of which is stationary and the other of which is rotatable. Magnetic tape is moved helically about the drums, and one or more magnetic transducer heads carried on the surface of the rotatable drum scan diagonally across the tape along relatively long paths at small acute angles to the tape edges as the drum rotates. The wrap of tape about the drums is substantially diagonally bisected at the clearance gap therebetween. The diagonal half of the tape overlying the rotating drum is fully lubricated by virtue of a self-acting air bearing being generated thereunder due to air swept under the tape by the rotating drum in a region of entrance for air. However, a self-acting air bearing is not generated under the diagonal tape half that overlies the stationary drum since there is no entrance region for air as is provided where the drums are counter rotated. Yet this half of the tape is still very nearly fully lubricated in accordance with the invention by means of a squeeze film bearing. In this regard, the bearing is generated by means of the projecting head or heads, or other protuberance, carried on the rotating drum adjacent the clearance gap between drums. More particularly, the tape is lifted mechanically by the projection or projections on the rotating drum, and while lifted, air is sucked under the tape by virtue of a relatively low pressure having existed thereunder prior to lifting. After the disturbance of lifting passes, a finite time is required for the air to be squeezed out from under the tape. During this time the tape is supported away from the surface of the stationary drum by the squeezing out air. The velocity of the rotating drum is such that a projection again lifts the tape before all of the air leaks out. In this manner, very nearly full lubrication of the entire wrap of tape is obtained with a single rotating drum. The scanning assembly can thus be made quite simple and inexpensive since only one drum is rotated.

Figure 1:
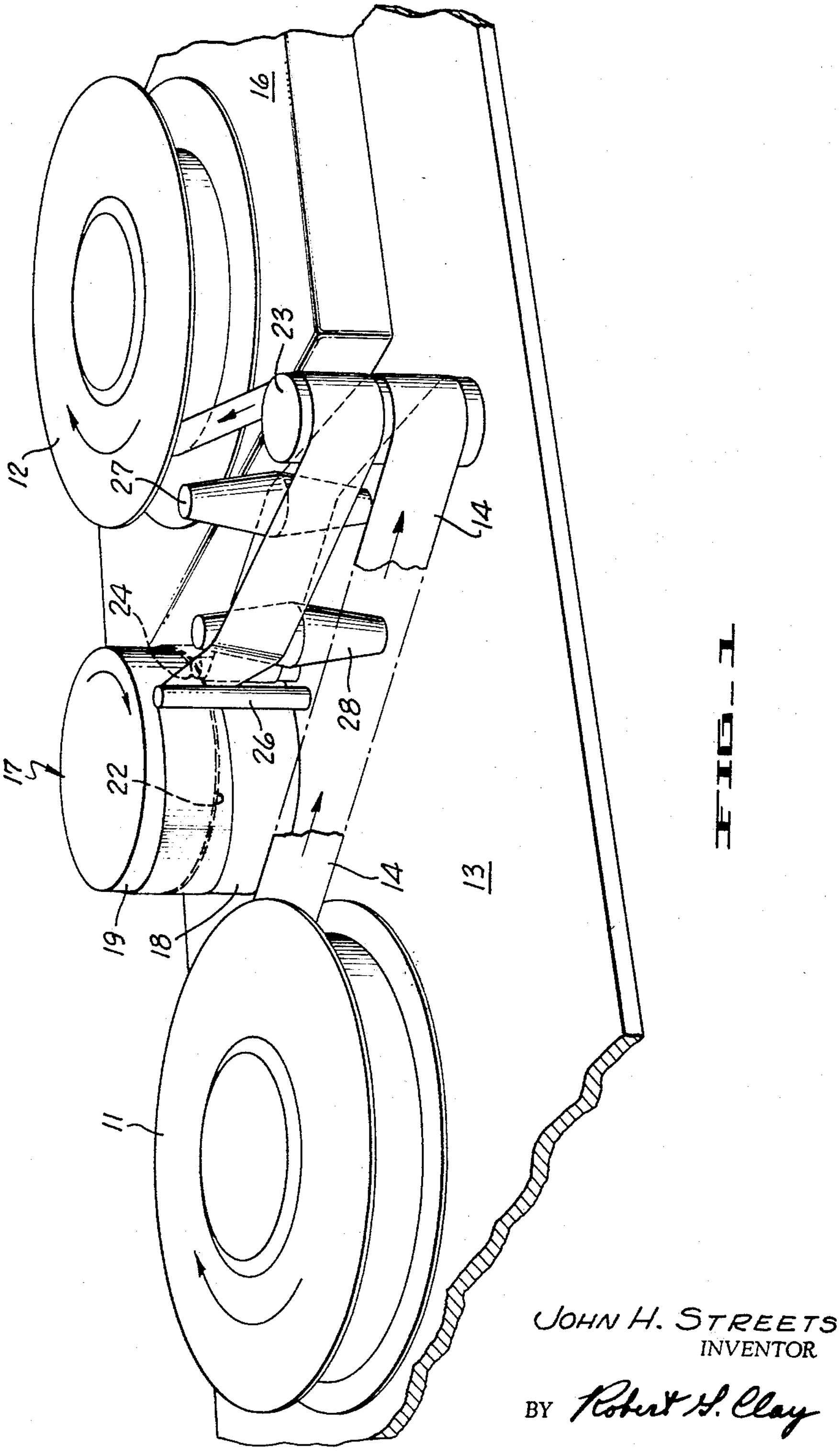
FIGURE 1 is a fragmentary perspective view of a tape transport incorporating a gas lubricated helical scanning assembly in accordance with the invention.

Considering now the invention in greater detail as to its incorporation in magnetic tape recording and reproducing apparatus, and as to the preferred structure of the helical scanning assembly, the tape transport of the apparatus, as shown in FIGURE 1, will be seen to include supply and take-up reels 11 and 12 mounted for rotation upon a deck 13 at spaced positions thereof, and which serve to store the magnetic tape 14. The supply reel is mounted upon the deck surface proper, while the take-up reel is mounted upon an upwardly stepped raised support portion 16 so as to be elevated with respect to the supply reel for purposes subsequently described.

Figure 3:
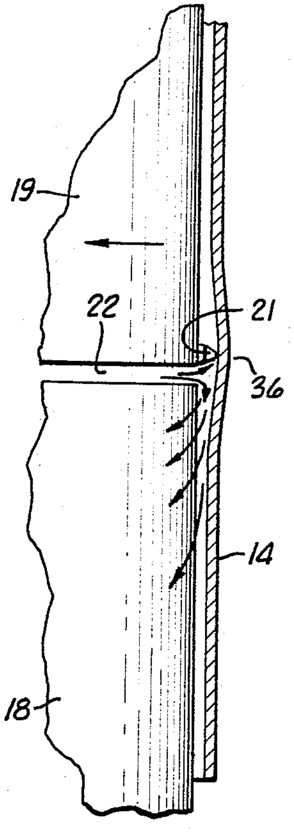
FIGURE 3 is an enlarged fragmentary sectional view taken at line 3—3 of FIGURE 2.

The length of tape 14 extending between the reels is wrapped helically about a scanning assembly 17 in accordance with the present invention. The scanning assembly includes coaxially closely spaced fixed and rotatable cylindrical drums 18 and 19 respectively, of the type outlined above. The assembly is mounted upon the deck 13 at a position intermediate the supply and take-up reels with the axis of the drums being parallel to the rotational axes of the reels. As best shown in FIGURE 3, at least one magnetic head 21 projects from the surface of the rotatable drum 19 adjacent the clearance gap 22 between the drums. However, for the purposes of generating a squeeze film air bearing in accordance with the present invention, a projection other than the head may be employed, or auxiliary projections may be employed in conjunction with the head, as will be subsequently explained in detail.

Driving and guidance of the tape helically about the scanning assembly 17 is preferably facilitated by means of a rotatable capstan 23, entrance and exit guide posts 24 and 26, and a pair of guide spindles 27, 28. The capstan is mounted on the deck 13 in forwardly spaced parallel relation to the scanning assembly. A line between the scanning assembly drum axis and capstan axis extends transversely of the deck and right angularly intersects a line between the reel axes which extends longitudinally of the deck. The guide posts are uniformally cylindrical and are mounted on the deck in close longitudinally spaced relation on opposite sides of the aforementioned transverse line. The posts are parallel to the axis of the drums and are in close spaced relation to the peripheries thereof. The spindles 27, 28 are mounted upon the deck on opposite sides of the transverse line at points between the capstan and posts and with wider longitudinal separation than that of the posts. The tape leaving the supply reel extends around the lower portion of the capstan 23, outwardly about the downwardly tapered lower half of spindle 27, through the gap between posts 24 and 26, around the inner periphery of the entrance post 24, and tangentially upon the fixed lower drum 18. The spindle 27 slants the lower edge of the tape slightly inward towards the transverse line between the capstan and scanning assembly. This causes the tape entering the scanning assembly to traverse an upward path as it extends substantially 360° therearound to the exit post 26. The tape thus extends about the scanning assembly in a helical "omega" wrap. The taper of the spindle is selected to impart a pitch to the helical wrap which positions substantially the entire width of the tape over the rotatable upper drum 19 at a point adjacent the exit post 26. The tape then tangentially leaves the upper drum to extend around the inner periphery of the post 26 and through the gap between the posts. The departing tape extends outwardly about the upper half of spindle 28 and around the upper portion of the capstan 23 onto the take-up reel 12. The spindle 28 slants the lower edge of the tape outwardly from the transverse line between the scanning assembly and capstan by an amount equal to the inward slant originally imparted by the spindle 27. In this manner, the twisting force resulting from the inward slanting of the tape is relieved before the departing tape reaches the capstan such that the tape extends uniformly tangentially upon the take-up reel 12 without kinking or twisting. By virtue of the helical wrap guided in the manner just described, the tape rises in passing around the scanning assembly. It is for this reason that the take-up reel is mounted in elevated position upon raised portion 16.

Although the guidance arrangement of the tape transport illustrated in the drawings provides an "omega" helical wrap about the scanning assembly 17, as previously noted, the specific form of wrap is purely illustrative and it will be appreciated that other forms of wrap may be employed upon appropriate modification of the guidance system. A 180° wrap may, for example, be advantageous in some situations with two heads mounted at diametrically opposed points of the rotatable drum 19. In addition, the guidance system may be arranged to provide an alpha wrap which extends 360°, or to provide a wrap having substantially any desired angular extent up to 360°.

One or more motors (not shown) are coupled to the take-up reel 12, rotatable drum 19, and capstan 23 to effect tape movement and drum rotation. Servo systems (not shown) are associated with the motor drive system to appropriately control same in a well known manner to compensate for tape and drum speed variations such as arise from frictional effects between the tape and scanning assembly. By the establishment of an effective air bearing between the tape and scanning assembly, the frictional effects are reduced to a negligible amount. The servo system may be thus made relatively simple and inexpensive. The scanning assembly 17 provides such an effective air bearing with structure of a relatively simple and inexpensive nature, and accordingly a material overall reduction in the cost of the tape recording and reproducing apparatus is afforded by the scanning assembly of the present invention.

Figure 2:
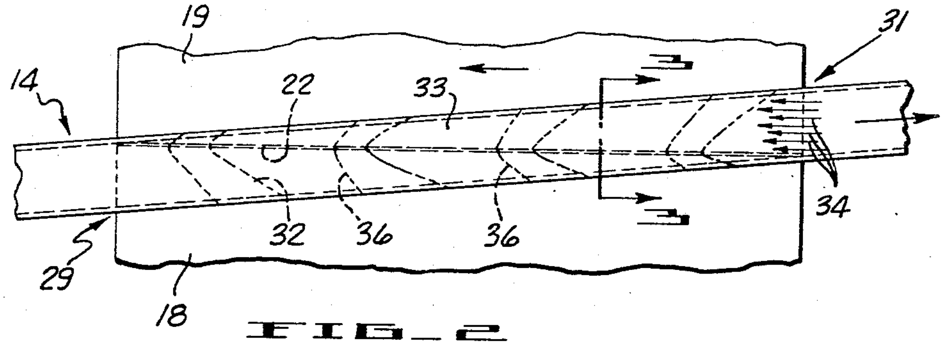
FIGURE 2 is a developed planar view of the peripheral surface of the drums of the scanning of the drums of the scanning assembly, illustrating the manner in which an air bearing is established beneath magnetic tape passing thereover.

Considering now the scanning assembly 17 in greater detail as to the establishment of the air bearing between the helical wrap of tape and the scanning assembly drums 18 and 19, reference is made to FIGURES 2, 3, 5, and 6 which graphically depict the generation of a self-acting air bearing under one diagonal half of the wrap and the establishment of a squeeze film bearing under the other half of the wrap. In this regard, it is to be noted that in the planar development of the cylindrical peripheries of the drums 18 and 19, and the helical wrap of tape therearound, as shown in FIGURE 2, the tape extends symmetrically across the clearance gap 22 between the drums at an acute angle thereto. Substantially the entire width of the tape overlies the stationary drum 18 at an entry point 29 adjacent the guide post 24, while substantially the entire width overlies the rotatable drum 19 at an exit point 31 adjacent the guide post 26. The tape is substantially diagonally bisected between the entry and exit points by the projection of the clearance gap 22. One diagonal half 32 of the tape thus overlies the stationary drum 18 while the other diagonal half 33 overlies the rotatable drum 19. Tape half 32 converges in a direction from entry point 29 towards exit point 31, and tape half 33 converges in the opposite direction from exit point 31 towards entry point 29. It is of importance to note that the rotatable drum 19 rotates beneath tape half 33 in a direction towards the converging point thereof, i.e., clockwise as viewed in the drawings. The tape exit point is thus a natural entrance region for air which is swept by the rotating drum beneath the tape half 33, as indicated by the arrows 34, to establish a self-acting air bearing which supports this half of the tape. There is no such entrance region for air beneath the other half 32 of the tape since it overlies the stationary drum 18. This half of the tape tends to be squeezed against the drum 18 such that a relatively low pressure would normally exist thereunder. However, the projecting head or other projection carried by the rotating drum 19 penetrates the tape as the projection sweeps diagonally beneath the tape in a direction opposite to the direction of tape travel. The projection mechanically lifts the penetrated portion of the tape to form a localized raised tent 36 which moves along a diagonal path about the tape wrap adjacent the clearance gap 22, as the drum 19 rotates. The region 37 beneath the tent forward of the projection and overlying the stationary drum 18 is initially of low pressure, since prior to lifting, the tape tends to be squeezed against such drum, as noted above. Therefore, air is sucked into the low pressure region 37 from the clearance gap 22, as indicated by the arrows 38. After the tent created by the projection passes, the air previously sucked into the region 37 is squeezed out from beneath the tape half 32 by the tension exerted on the tape which tends to force the tape against the stationary drum. In other words, the region 39 of the tent rearward of the head and overlying the stationary drum has been previously pressurized, and the air therein leaks laterally outward beneath the edge of the tape, as indicated by the arrows 41, by virtue of the squeezing action of the tape. A finite time is required for the air to be squeezed out from beneath the regions of the tape trailing the moving projection, and during this time the tape half 32 is supported upon a squeeze film bearing and is thus lubricated. Moreover, the time required for the air to escape is longer than the time required for the same, or another projection to again lift the tape and cause more air to be sucked beneath the tape. In this manner a squeeze film bearing is continuously maintained beneath the tape half 32, while a self-acting bearing is generated beneath tape half 33. The entire helical wrap of tape is thus gas lubricated, and it has been found that the lubrication provided may be made at least 99% of, and closely approaching, full lubrication.

Figure 4:
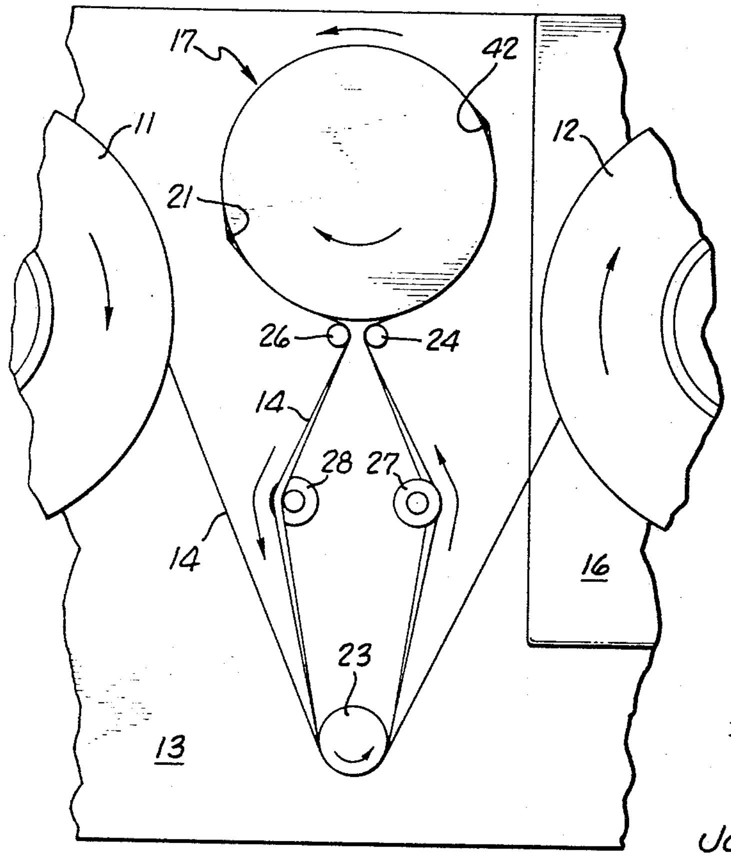
FIGURE 4 is a fragmentary plan view of the tape transport illustrating particularly the guide means employed to feed tape to the scanning assembly in a helical wrap thereabout and also depicting a modified form of rotatable head drum.
Figure 5:
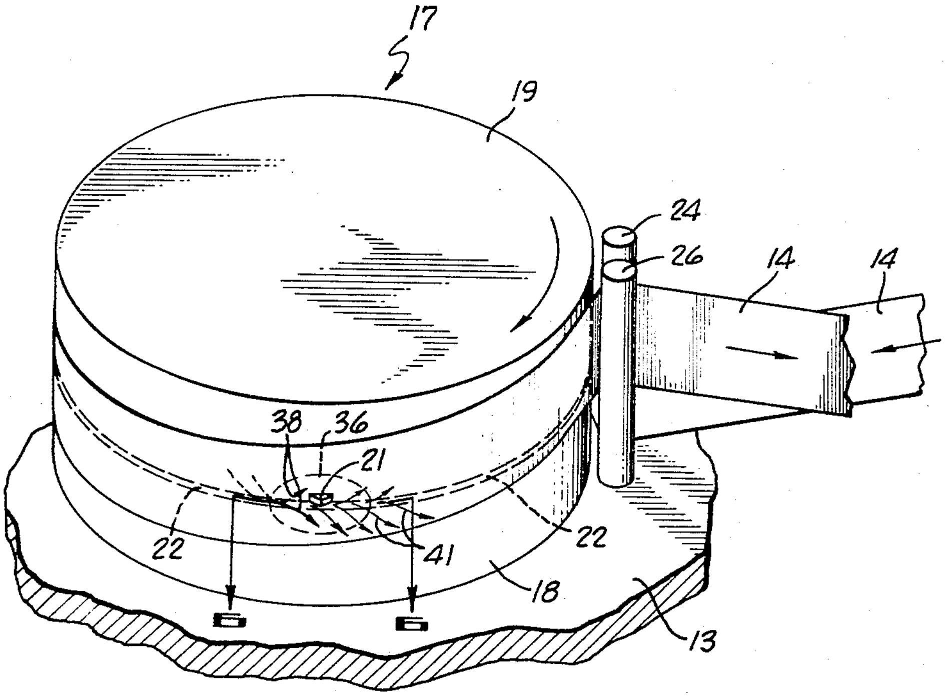
FIGURE 5 is a fragmentary perspective view of the scanning assembly, diagrammatically illustrating the generation of a squeeze film.
Figure 6:
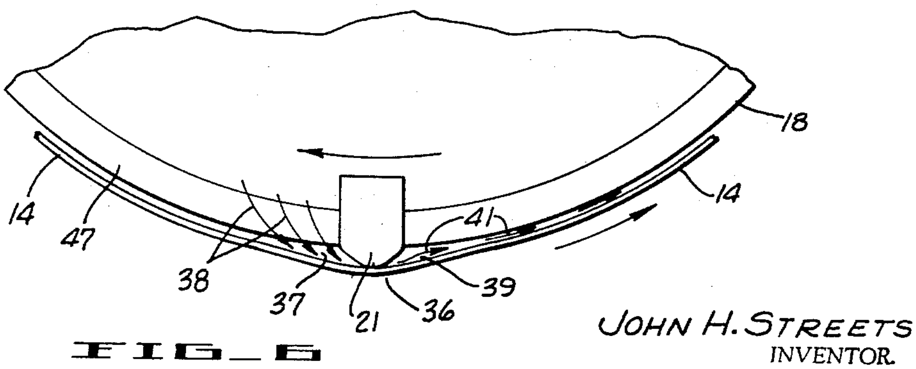
FIGURE 6 is an enlarged sectional view taken at line 6—6 of FIGURE 5.

As previously noted, the squeeze film bearing generating projection carried by the rotatable drum 19, may be the magnetic head 21, or a plurality thereof, or auxiliary projections or protuberances carried by the rotatable drum adjacent the clearance gap 22. In this regard, the optimum head to tape penetration for recording and playback may be less than the optimum penetration for generating the squeeze film air bearing. In order to optimize both conditions, the head 21 may project an amount which is commensurate with optimum head to tape penetration. An auxiliary protuberance 42 projecting a greater amount providing optimum squeeze film lubrication may be also carried by the rotatable drum 19, as illustrated in FIGURE 4. A plurality of protuberances may be provided to increase the squeeze film lubrication effect for a given speed.

Figure 7:
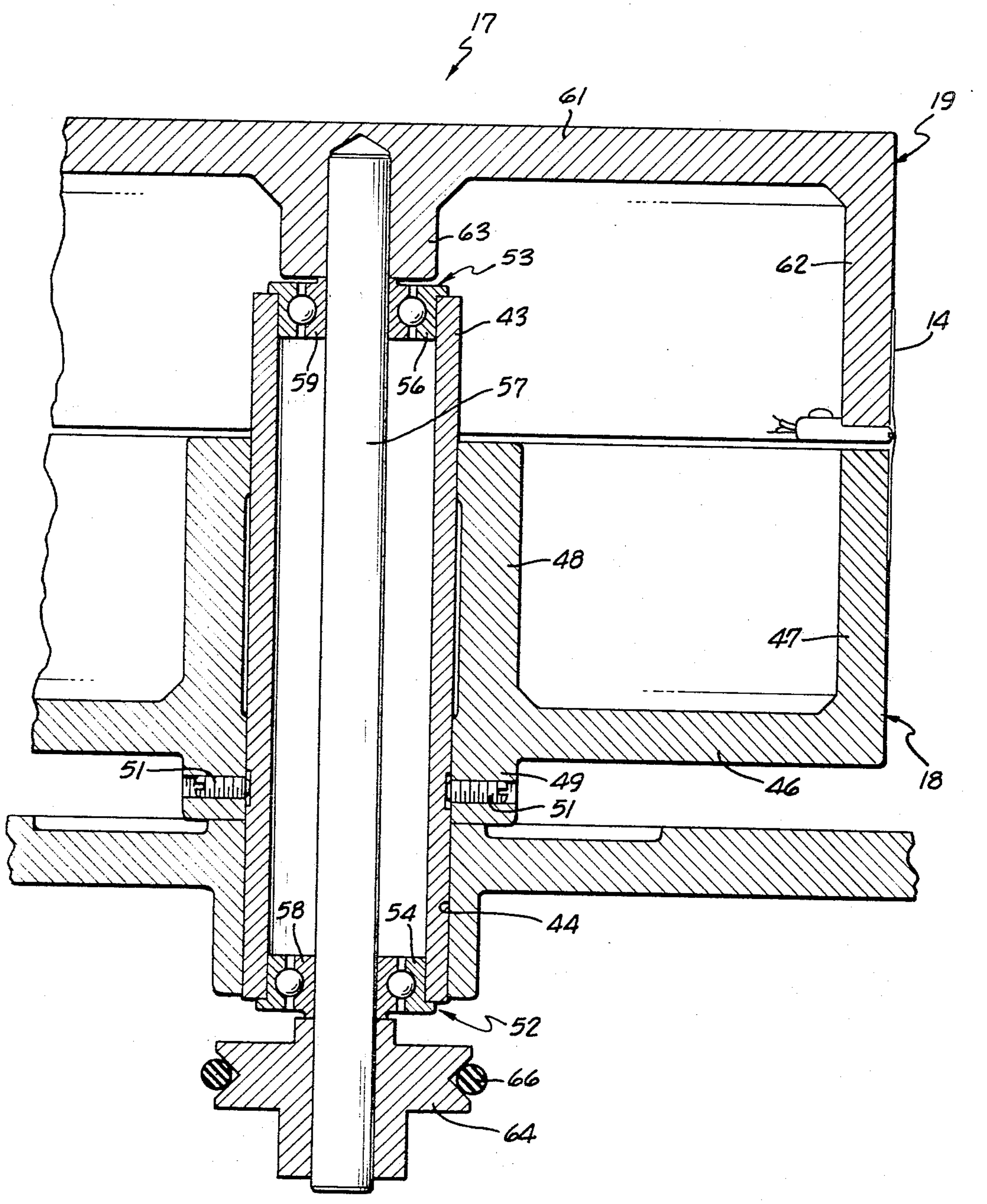
FIGURE 7 is a sectional view taken at a diametric plane through a preferred form of the scanning assembly.

Considering now the gas lubricated helical scanning assembly 17 in greater detail as to the preferred structure thereof, and referring to FIGURE 7, the stationary drum 18 is mounted upon the deck 13, while the rotatable drum 19 is coaxially journalled atop the stationary drum. This is preferably accomplished by means of a fixed sleeve 43 which extends through a bore 44 provided in the deck and projects normally upward therefrom. The stationary drum 18 is of cylindrical cupped configuration including a circular base portion 46 and annular peripheral portion 47 projecting marginally upward therefrom. The base portion is formed with a central re-entrant bushing 48 and a depending hub 49. The sleeve 43 is received by the bushing and hub of the drum, while the hub is supported upon the deck. The drum 18 is fixedly secured to the sleeve 43 as by means of set screws 51 extending radially through the hub 49 and engaging the sleeve.

Rotatable mounting of the drum 19 is facilitated by bearings 52, 53 having outer races 54, 56 secured in fixed position coaxially within the opposite ends of the sleeve 43. A shaft 57 extends coaxially through the sleeve and through the inner races 58, 59 of the bearings. The shaft is fixedly secured to the inner races and is hence readily rotatable with respect to the sleeve and deck. The drum 19 is preferably of cylindrical cupped configuration including an upper circular end portion 61 and depending annular peripheral portion 62. The end portion 61 is formed centrally with a depending hub 63 which is fixedly secured to the projecting end of shaft 57 such that the drum is rotatable with the shaft. As thus mounted, drum 19 is coaxially rotatable relative to drum 18, and the peripheral portion 62 of drum 19 is disposed in closely spaced coaxially aligned facing relation to the peripheral portion 47 of drum 18. Driven rotation of drum 19 is effected as by means of a pulley 64 secured to shaft 57 subjacent the deck 13, such pulley receiving a belt 66 driven by the drum motor (not shown) and in turn effecting rotation of the drum 19.

There is thus provided by the present invention, a helical scanning assembly 17 for video tape recording and reproducing apparatus which generates an extremely effective air bearing for supporting the helical wrap of tape extending about the assembly. As previously explained, the air bearing is generated by means of a single rotating drum 19 and a stationary drum 18 of the scanning assembly, whereby the structure of the assembly is of a relatively simple and inexpensive nature. The air bearing generated by the scanning assembly reduces fractional effects on the tape to a negligible amount such that the servo systems associated with the tape and head drum drives are of comparatively simple and low cost design. The overall result is video tape recording and reproducing apparatus having a comparatively low cost.

Although the invention has been described hereinbefore with respect to a single preferred embodiment, it will be appreciated that numerous modifications and variations may be made therein without departing from the true spirit and scope of the invention, and thus it is not intended to limit the invention except by the terms of the following claims.

What is claimed is:

1. In magnetic tape apparatus, a helical guiding assembly comprising a pair of substantially cylindrical coaxially closely spaced drums having a clearance gap therebetween, one of said drums being fixed and the other being rotatable relative to the fixed drum, said rotatable drum having a protuberance on its peripheral surface adjacent said gap, means for guiding magnetic tape along a helical path about said drums extending substantially diagonally across said gap, and means for rotating said rotatable drum to generate a self-acting air bearing beneath the diagonal half of the tape overlying same and to generate a squeeze film air bearing beneath the diagonal half of the tape overlying the stationary drum by penetration of said protuberance into said tape.

2. The combination of claim 1, wherein said protuberance is a magnetic transducer head for recording signals on said tape and reproducing signals recorded thereon.

3. The combination of claim 1, further defined by a magnetic transducer head carried on the peripheral surface of said rotatable drum adjacent said gap, said head projecting from said rotatable drum an amount commensurate with optimum head to tape penetration for recording and reproduction of signals, said protuberance projecting from said rotatable drum an amount greater than said head commensurate with optimum conditions for the generation of said squeeze film air bearing.

4. In a magnetic recorder having a tape deck, tape supply and take-up reels mounted for rotation upon said deck at spaced positions thereof, and means for driving magnetic tape between said supply and take-up reels, the combination comprising a substantially cylindrical cupped drum having a circular base and upstanding annular peripheral portion mounted in fixed position on said deck intermediate said supply and take-up reels, a second substantially cylindrical cupped drum having a circular end and depending annular peripheral portion mounted for rotation in coaxial relation to said first drum with said depending peripheral portion in close coaxially spaced facing relation to said upstanding peripheral portion of said first drum, a protuberance radially projecting from said second drum adjacent said first drum, means for guiding said magnetic tape driven between said supply and take-up reels in a helical wrap about said drums extending substantially diagonally across the clearance gap therebetween, and means coupled to said second drum for rotating same in a direction to sweep air beneath the portion of the tape wrap disposed thereover.

5. The combination of claim 4, further defined by said tape guiding means guiding said tape to enter said helical wrap adjacent said first drum and exit said wrap adjacent said second drum, and by said second drum being rotated in a direction opposite to that of movement of said tape.

6. The combination of claim 4, further defined by said protuberance being a magnetic transducer head.

7. In magnetic recording and reproducing apparatus having a tape deck, tape supply and take-up reels mounted for rotation upon said deck at spaced positions thereof, and means for moving magnetic tape between said supply and take-up reels, the combination comprising a fixed sleeve extending through said deck and projecting upwardly therefrom at a position intermediate said reels, a substantially cylindrical cupped drum having a circular base and upstanding annular peripheral portion fixedly mounted upon said deck and coaxially traversed by said sleeve, a shaft, bearing means journalling said shaft for rotation coaxially within said sleeve, a second substantially cylindrical cupped drum having a circular upper end portion and depending annular peripheral portion coaxially secured to said shaft with said depending peripheral portion in coaxial facing relation to said upstanding peripheral portion, at least one protuberance projecting radially from the surface of said peripheral portion of said second drum adjacent the clearance gap between said drums, means for guiding magnetic tape moving between said supply and take-up reels in a helical wrap extending about said drums with said tape being substantially diagonally bisected by said clearance gap, said wrap having an entrance point whereat substantially the entire width of said tape overlies said first drum and an exit point whereat substantially the entire width of said tape overlies said second drum, and drive means coupled to said shaft for rotating said second drum in a direction opposing that of tape movement in said wrap.

8. The combination of claim 7, further defined by said at least one protuberance being at least one magnetic transducer head.

9. The combination of claim 7, further defined by said at least one protuberance being at least one magnetic transducer head and at least one projection, each head projecting a distance commensurate with optimum head to tape penetration for recording and reproduction, each projection projecting a distance greater than that of each head commensurate with optimum generation of a squeeze film air bearing for supporting the portion of said wrap overlying said first drum.

10. Magnetic tape recording and reproducing apparatus comprising a tape deck, tape supply and take-up reels mounted for rotation upon said deck at longitudinally spaced positions thereof, a pair of cylindrical drums coaxially mounted upon said deck with an axis parallel to the axes of said reels and longitudinally intermediate same, the lower one of said drums being fixed and the upper one thereof being rotatable, a magnetic transducer head projecting from said upper drum adjacent said lower drum, capstan means mounted upon said deck for rotation about an axis parallel to the axis of said drums at a position transversely spaced therefrom, a pair of spindles mounted upon said deck at equal longitudinally spaced points on opposite sides of a transverse line between the axes of said drums and capstan, entrance and exit guide posts mounted upon said deck in close longitudinally spaced relation on opposite sides of said transverse line and in close spaced relation to the peripheries of drums, and means coupled to said upper drum for rotating same.

References Cited

UNITED STATES PATENTS

| | | | |
|---|---|---|---|
| 2,968,702 | 1/1961 | Fay | 226—95 X |
| 2,998,495 | 8/1961 | Maxey | 179—100.2 |

M. HENSON WOOD, JR., *Primary Examiner.*

R. A. SCHACHER, *Assistant Examiner.*